April 23, 1929.  C. F. M. VAN BERKEL  1,710,125
WEIGHING SCALE
Filed April 12, 1928
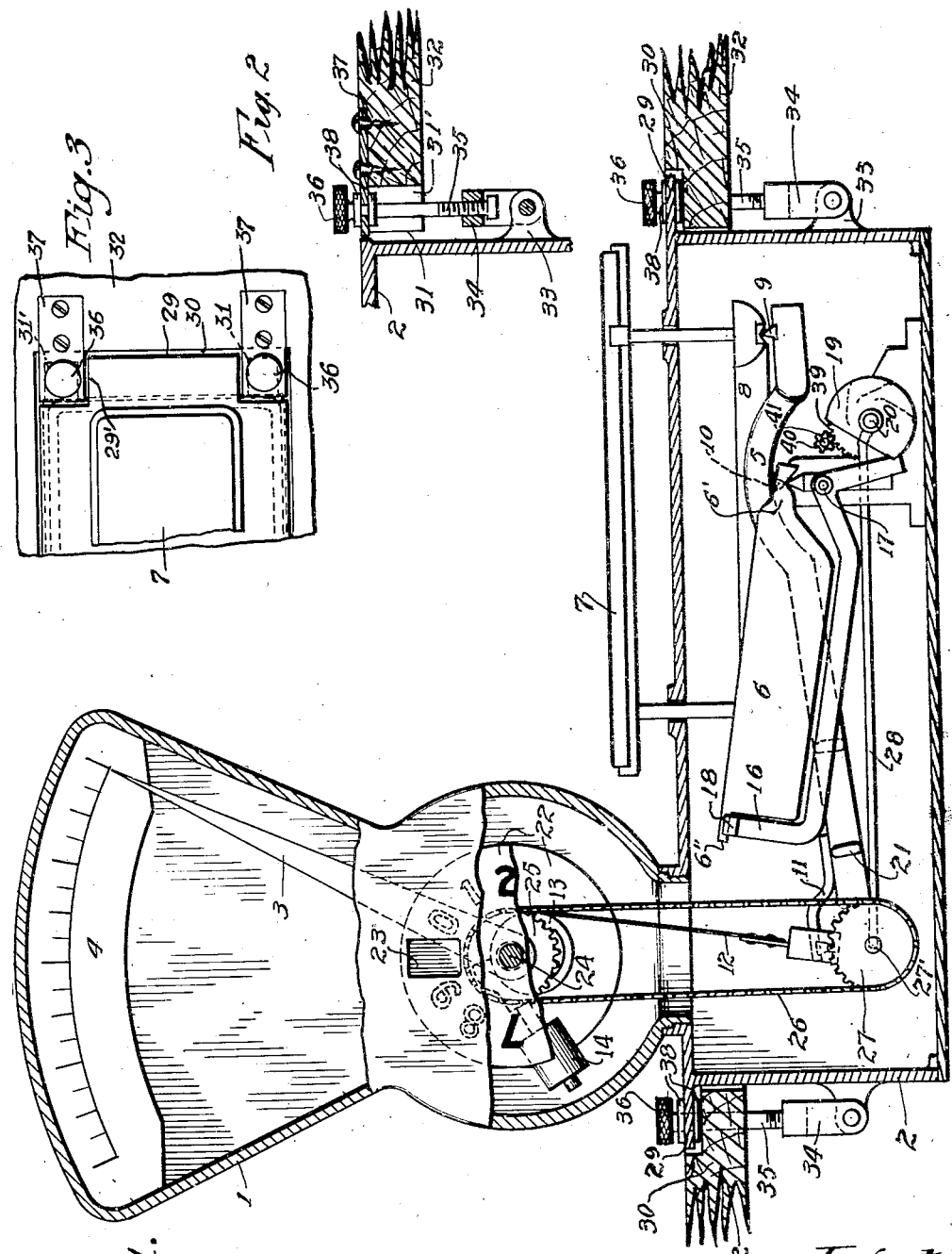
Inventor:
Cornelis F. M. Van Berkel
By: Nissen & Crane
Atty's Patented Apr. 23, 1929.

1,710,125

UNITED STATES PATENT OFFICE.

CORNELIS F. M. VAN BERKEL, OF WASSENAAR, NETHERLANDS, ASSIGNOR TO NAAM-LOOZE VENNOOTSCHAP MAATSCHAPPIJ TOT VERVAARDIGING VAN SNIJMA-CHINES VOLGENS VAN BERKEL'S PATENT EN VAN ANDERE WERKTUIGEN, OF ROTTERDAM, NETHERLANDS, A LIMITED-LIABILITY COMPANY OF THE NETHER-LANDS.

WEIGHING SCALE.

Application filed April 12, 1928, Serial No. 269,521, and in Great Britain February 15, 1927.

This invention relates to weighing scales, more particularly to scales of the type arranged for variable capacity. Scales of this type are in common use and are generally automatic or semi-automatic and have either one or two platforms. In some scales, supplementary weights are carried by the weighing beam and are associated with means for moving them into positions on the beam corresponding to the several capacities of the scale. In other scales, the supplementary weights may be selectively caused to bear upon the weighing beam to vary the capacity of the scale. The usual upstanding casing of the apparatus together with the graduated reading scale are arranged either in the same vertical plane as the weighing beam or transversely of said plane, the weighing beam and supplementary weights being housed within a lower casing.

It is well known that scales of the above type, especially those in which the reading scale is arranged in the same plane as the weighing beam, take up considerable space on shop counters or the like, and a scale of this kind, in order to be a thoroughly efficient and reliable device, requires to be of proportions which render it inconvenient when placed on a shop counter. Moreover, as the entire exterior of the scale is exposed (except for the under side of the base) it is customary to provide the visible parts with highly finished surfaces, the several processes requisite for which involve time and labor, thereby materially adding to the cost of manufacturing the scale.

It is an object of this invention to reduce to a minimum the above inconvenience caused by large weighing scales and, at the same time, to reduce the cost of their production.

Another object of the invention is to provide an improved means for depositing supplementary weights on the weighing beam.

Other objects will appear as the description proceeds.

According to this invention the weighing scale is adapted to be fitted to, or arranged in, a counter or other supporting structure in such manner that the scale, when in position, will be partly above and partly below the plane of the top of the structure. In this way it will be possible to arrange for the weighing beam and its associated parts to be beneath the plane of the top of the structure while the weighing platform or platforms can be above.

Means may be provided for raising or lowering the scale for the purpose of levelling it, this being particularly desirable for scales of the "pendulum weight" type.

In order that the invention may be clearly understood, one embodiment thereof, chosen by way of example, will now be described with reference to the accompanying drawing, in which:

Fig. 1 is a sectional elevation of a weighing scale shown fitted in a shop-counter (only so much of the latter as is necessary for understanding the invention being shown);

Fig. 2 is a fragmentary detail view; and

Fig. 3 is a fragmentary plan view thereof.

The weighing scale shown somewhat diagrammatically in Fig. 1 is of the pendulum weight type and comprises an upstanding casing 1 and a lower casing 2. The upper casing encloses the indicator pointer 3 and the graduated scale plate 4, and the lower casing encloses the weighing beam 5 and the supplementary weights 6 for varying the capacity of the weighing scale.

In order that the weight indicated by the pointer 3 may be observed from both sides of the scale, the plate 4 might be graduated on both sides and the pointer 3 bifurcated.

The weighing platform 7 is positioned above the lower casing 2 and is connected to the weighing beam 5 in a well-known manner, through the intermediary of parallel link mechanism (not shown), including a member 8 which bears on the short arm of the beam 5 where indicated by the numeral 9. The beam 5 is fulcrumed at 10, and the free end of its long arm is fitted with an extension 11 connected by a flexible strap 12 to a turnable eccentric pulley 13 carrying the pointer 3. The eccentric pulley 13 is weighted by an adjustable pendulum weight 14 acting to maintain the strap 12 taut.

The supplementary weights 6 (of which one only is shown, the others being in line behind the one shown), each bear at one end 6' on one of several knife-edges 15, all disposed in alignment with the edge of the fulcrum 10 of the beam 5. The opposite end 6'' of each weight 6 rests, when the weight is inoperative, on one of several supporting levers 16, fulcrumed at 17. Each lever, at one end, has a fork 18, in which the relative weight 6 rests, whilst, at the other end, the lever bears against one of several cams 19 on a spindle 20. By manually turning the spindle 20, selected levers 16 are permitted to rock counter-clockwise and thereby deposit the ends 6'' of the relative weights 6 on a projection 21 extending laterally from the beam 5. When each weight 6 acts thus upon the beam 5, the capacity of the scale is increased by a predetermined amount, and this amount is indicated by numerals on a pair of dials 22 which can be observed through apertures 23 at opposite sides of the casing 1, through which apertures a number, representing the capacity for which the scale is set, can be read from both sides of the scale.

The dials 22 are secured to a spindle 24 on which the eccentric pulley 13 is freely mounted, this spindle being adapted to turn in unison with the spindle 20, to which it is operatively connected by gearing comprising a pair of sprocket wheels 25 on the spindle 24, a pair of sprocket wheels 27 on a spindle 27', a pair of chains 26 passing round the wheels 25 and 27, and a flexible shaft 28 interconnecting the spindles 27' and 20.

The lower casing 2 is bounded by a flange 29 flush with the top of the casing. As shown, the flange 29 fits within a recess 30 formed around an opening 31 in the shop-counter 32 and the corners are cut away at 29' to receive plates 37, to be described later. The casing 2 is disposed within this opening, its upper surface being approximately in the same plane as the top of the counter. Near each corner of the casing 2, lugs 33 are cast. A bifurcated nut 34 is pivotally connected to each lug 33 and is penetrated by a screw-threaded bolt 35 having a knob 36 for adjusting it. The bolts 35 pass freely through holes in plates 37 (Fig. 2) secured to the counter and projecting into recesses 29' of flange 29, collars 38 on the bolts being located on both sides of each plate. It will be apparent that, by adjusting the bolts 35 relatively to the nuts 34, the entire scale can be levelled.

As shown in Fig. 2, the bolts 35 pass through slots 31' in the counter 32, the slots being so dimensioned as to permit the lugs 35 to pass through them and being closed at their top ends by the relative plates 37.

To enable the spindle 20 to be manually turned, the spindle has secured to it a spur-wheel 39 meshing with a pinion 40 on a spindle 41, which would extend through the wall of the lower casing 2 and would terminate in a finger-knob (not shown) located outside the counter. Where the counter is provided, at the side thereof where the attendant stands, with a vertical wall, the spindle 41 would extend through an opening in this wall.

A weighing scale made and adapted to be fitted in a supporting structure as above described may be of substantial proportions and yet not require an unduly large space above the structure for its accommodation. Further, the surface of the lower casing which is not visible above the structure need not be finely finished as by lacquering or enamelling.

The embodiment described and illustrated may be modified without departing from the scope of the invention. For instance, in cases where the scale need not be truly level, the lower casing may simply have a surrounding flange or bead or the like, adapted to fit into or be supported by a conformable check or part in the wall of the opening in the structure, the arrangement however being such that when the scale is in place the upper surface of the lower casing will be approximately flush with the top of the structure. Rubber or like packing may be inserted between the flange or bead and the check in the opening in the structure.

Obviously those skilled in the art may make various changes in the construction and arrangement of parts without departing from the spirit and scope of the invention as defined by the claims hereto appended, and I therefore do not wish to be restricted to the precise construction herein disclosed.

I claim—

1. In combination with a scale having a weighing platform and a casing containing weighing mechanism, of members pivoted to the sides of said casing below the top thereof, and leveling studs threaded into said members, said studs having means at their upper ends to suspend said scale from a support.

2. In combination with a scale having a weighing platform and a casing containing weighing mechanism, of members pivoted to the sides of said casing below the top thereof, and leveling studs threaded into said members, said studs having spaced collars rigid therewith.

3. In combination with a scale having a weighing platform and a casing containing weighing mechanism, of members pivoted to the sides of said casing below the top thereof, and leveling studs threaded into said members, said casing having flange portions adjacent the top thereof, and said studs having spaced collars thereon, the space between said collars being adapted to receive said flange portions.

4. In combination with a supporting structure having a gap therein, of a scale having a mechanism containing casing positioned within said gap with the top of said casing substantially flush with the top surface of said supporting structure, said casing having members attached thereto below its top surface for suspending said scale from said supporting structure.

5. In combination with a supporting structure having a gap therein, of a scale having a mechanism containing casing positioned within said gap with the top of said casing substantially flush with the top surface of said supporting structure, said casing having members pivoted thereto below its top surface and leveling studs screwed into said members, said studs having means at their upper ends to suspend said scale from said supporting structure.

6. In combination with a supporting structure having a gap therein, of a scale having a mechanism containing casing positioned within said gap with the top of said casing substantially flush with the top surface of said supporting structure, said casing having members pivoted thereto below its top surface, leveling studs screwed into said members, and a plate on said support extending beyond the edge thereof, said studs having collars thereon, said plate being received between said collars.

7. In combination with a recessed supporting structure having a gap therein, of a scale having a flanged mechanism containing casing within said gap with said flange positioned over the recessed portion of said supporting structure, members pivoted to said casing, leveling studs threaded into said members, and collars on said studs between which said flange is received.

8. In combination with a weighing scale having a weighing platform and a casing containing weighing mechanism, of a combined supporting and leveling means associated with said casing, said supporting and leveling means being adapted to co-operate with a support at the sides of said casing, said supporting and leveling means being disposed with respect to said casing to position the weighing mechanism in said casing below the plane of said support around said casing.

In testimony whereof I have signed my name to this specification on this 30th day of March, A. D., 1928.

CORNELIS F. M. van BERKEL.